United States Patent
Neumann et al.

(10) Patent No.: US 7,610,911 B2
(45) Date of Patent: Nov. 3, 2009

(54) HELIOTHERMAL FLAT COLLECTOR MODULE HAVING A SANDWICH STRUCTURE

(75) Inventors: Frank Neumann, Datteln (DE);
Markus Patschke, Nordkirchen/Suedkirchen (DE);
Marianne Schoennenbeck, Bochum (DE)

(73) Assignee: Rheinzink GmbH & Co KG, Datteln (DE)

( * ) Notice: Subject to any disclaimer, the term of this patent is extended or adjusted under 35 U.S.C. 154(b) by 176 days.

(21) Appl. No.: 10/530,384

(22) PCT Filed: Oct. 18, 2003

(86) PCT No.: PCT/EP03/11573

§ 371 (c)(1),
(2), (4) Date: Apr. 6, 2005

(87) PCT Pub. No.: WO2004/038306

PCT Pub. Date: May 6, 2004

(65) Prior Publication Data

US 2006/0070621 A1    Apr. 6, 2006

(30) Foreign Application Priority Data

Oct. 23, 2002    (DE) .............................. 202 16 297 U

(51) Int. Cl.
*E04D 13/18*    (2006.01)
(52) U.S. Cl. .................... 126/622; 126/621; 126/569
(58) Field of Classification Search ................. 126/622, 126/709, 664, 663, 271, 270, 661, 569
See application file for complete search history.

(56) References Cited

U.S. PATENT DOCUMENTS

| | | | | |
|---|---|---|---|---|
| 4,000,850 A | * | 1/1977 | Diggs .......................... | 126/613 |
| 4,074,406 A | * | 2/1978 | Boyd et al. ............. | 29/890.033 |
| 4,144,874 A | * | 3/1979 | Zebuhr ........................ | 126/664 |
| 4,186,795 A | * | 2/1980 | Platell ........................... | 165/53 |
| 4,191,169 A | * | 3/1980 | Hyman ........................ | 126/668 |
| 4,336,793 A | * | 6/1982 | Ahearn et al. ............... | 126/621 |
| 4,517,721 A | * | 5/1985 | Graham .................. | 29/890.038 |
| 4,606,327 A | * | 8/1986 | Bloor et al. .................. | 126/569 |
| 4,911,353 A | * | 3/1990 | Deakin ........................ | 228/183 |
| 5,167,218 A | * | 12/1992 | Deakin ........................ | 126/569 |
| 5,389,159 A | * | 2/1995 | Kataoka et al. ............. | 136/251 |

FOREIGN PATENT DOCUMENTS

| | | |
|---|---|---|
| BE | 878 046 | 4/1980 |
| DE | 100 43 295 C1 | 9/2000 |
| FR | 2 777 984 | 4/1998 |
| GB | 2 183 817 A | 11/1986 |

* cited by examiner

*Primary Examiner*—Kenneth B Rinehart
*Assistant Examiner*—Chuka C Ndubizu
(74) *Attorney, Agent, or Firm*—Eckert Seamans Cherin & Mellott, LLP

(57) ABSTRACT

A self-supporting heliothermal flat collector module includes a sheet metal panel; a register-type arrangement of capillary tubes separated from one another for the flow of a fluid medium that lies on the rear side of the sheet metal panel opposite that to be irradiated; and a thermally-insulating insulation core also positioned on the rear side. According to the invention, the capillary tubes of the register-type arrangement are placed into contact with the surface of the thermally-insulating insulation core, and the thermally-insulating insulation core is attached to the sheet metal panel by means of an elastic adhesive layer, whereby the capillary tubes are at least partially embedded into the adhesive layer between the sheet metal panel and the insulation core.

18 Claims, 3 Drawing Sheets

HELIOTHERMAL FLAT COLLECTOR MODULE HAVING A SANDWICH STRUCTURE

BACKGROUND OF THE INVENTION

The invention relates to a self-supporting heliothermal flat collector module that includes:
A sheet metal panel,
A register-type arrangement of capillary tubes separated from one another for the flow of a fluid medium that lies on the rear side of the sheet metal panel opposite that to be irradiated, and
A thermally-insulating insulation core also positioned on the rear side.

A flat collector module of this type is known from DE-PS 100 43 295. This patent basically provides for the capillary tubes to be attached to the sheet metal panel by means of surface spraying with fluid metal particles. An adhesive connection of the sheet metal panel configured with the capillary tubes to the foam insulation core may also be taken from DE-PS 100 43 295, but in any case, the details of the adhesive connection are not specified.

Such an adhesive connection presents a technical problem in heliothermic flat collector modules since the joining parts possess varying elasticity modules, and thus multi-axis tension components may arise. In particular, the sheet metal panel exposed to solar irradiation may be strongly warmed and deformed. Resultantly, the adhesive connection may be at least partially destroyed, and the contact between the capillary tubes and the sheet metal panel may be interrupted.

SUMMARY OF THE INVENTION

It is the object of the invention to prevent the above-mentioned disadvantages, and to provide a self-supporting heliothermic flat collector module of the type mentioned at the outset in which the insulation core may be connected to the sheet metal panel, particularly one of a titanium-zinc alloy, without tension across a wide temperature range.

This object is achieved by a self-supporting heliothermic flat collector module of the type mentioned above in which
the capillary tubes of the register-type arrangement are placed into contact with the surface of the thermally-insulating insulation core, and
the thermally-insulating insulation core is attached to the sheet metal panel by means of an elastic adhesive layer, whereby the capillary tubes are at least partially embedded into the adhesive layer between the sheet metal panel and the insulation core.

Each of the capillary tubes may be inserted into a slot worked into the thermally-insulating insulation core whereby the capillary tubes essentially lie flush with the insulation core, or extend from the insulation core by a certain distance, where said distance essentially corresponds to a thickness dimension of the fluid adhesive layer before hardening.

Alternatively, the capillary tubes in the register-type arrangement may be laid directly onto a flat surface of the thermo-insulating insulation core.

In both cases, the thermo-insulating insulation core may at least be bound to the sheet metal panel by means of the elastic adhesive layer. This means that the peak areas of the capillary tubes facing the sheet metal panel may be in direct contact with the sheet metal panel without the adhesive reaching the peak areas. The capillary tubes may also be completely surrounded by adhesive, particularly if the adhesive has distinguishing thermo-conductive characteristics. These characteristics may be provided to the adhesive by, for example, mixing in a metal powder.

It is further conceivable to mix fibers of short pile length homogenously so that an increased degree of wear resistance or stability of the adhesive layer results. These fibers might possess a length of, for example, between 0.5 and 3 mm. Glass fibers are particularly suited to this application.

The flat or slotted surface of the insulation core may include numerous recesses to receive adhesive substances that are still moist that preferably extend to the slot depth or slightly exceed it. This measure can contribute to the stability of the bond. The recesses may, for example, be produced by impression from a bristle roller, a potentially heated stamp, or similar.

The thermally insulating insulation core may be of foam, particularly of polystyrene or polyurethane hard foam, or of a fibrous material such as mineral wool.

Since the adhesive properties of plastics, including hard foams, are significantly limited in comparison to those of metals, reaction adhesives operating on the adhesion bond principle are used fairly exclusively. Diffusive adhesion is not suitable because of the non-permeability of the sheet metal panel.

Thus, the adhesive layer may be formed, for example, of an organic, chemically curing single-component adhesive based on meth-acrylate. The adhesive layer may also be formed of other adhesives that distinguish themselves by their good bond to metals and plastics. For this, reaction adhesives based on styrene co-polymerization or elastomer polyurethane resins are used. The significant point is that the adhesive layer remains permanently elastic after hardening, and does not begin to flow because of subsequent solar irradiation. The deformation capacity of the adhesive layer thus produced and hardened allows compensation of tension components.

The sheet metal panel may be produced as one piece with two angled, arc-shaped edge profiles by means of which a stair-step configuration of the roof surface may be achieved.

The sheet metal panel may also be produced as one piece with two opposing edges bent at an angle to connect the sheet metal panels to one another in a folding technique.

The flat collector module based on the invention may be provided with at least one plank or plate shaped stiffening element that is positioned on a side of the insulation core facing away from the sheet metal panel.

In another embodiment, a plastic or metal cassette may be provided on the insulation core that includes two opposing edges bent outwards, by means of which the plastic or metal cassette is supported on the underside of the sheet metal panel. An elastic body such as foam or rubber strips, or an elastic adhesive band, may lie between the sheet metal panel and the bent edge of the metal cassette. The material of the elastic body must, however, be protected against aging and weathering.

The capillary tubes are of metal, preferably of copper or stainless steel. Use of metal-coated plastic tubes or uncoated plastic tubes along the periphery instead of metal ones is not excluded.

If the insulation core is adequately strong, and the adhesive bond produced between the insulation core and the sheet metal panel is adequately elastic, the metal cassette or the lower stiffening element is not required.

It is of great advantage that the thermal contact between the tube system be uninterrupted, since the capillary tubes are embedded into the adhesive layer, and are compressed together by means of the sheet metal panel and the insulation core. This prevents the formation of condensation and electro-chemical corrosion.

Of course, the flat collector modules may also be used to cool a particular space, since heat may be surrendered via the collector. Additionally, there is the option of using the heat energy thus acquired to melt snow in winter. For example, a combined, automatically-controlled technique may be chosen in which so-called direct heating may be supported by flat collector modules.

It is expressly stated that the flat collector module based on the invention is a low-temperature collector in which no "greenhouse effect" occurs, i.e., no additional transparent coverings are present on the side of the sheet metal panel to be irradiated that would normally form a sealed space to be heated. The sheet metal panel is thus directly exposed to the rays of the sun.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
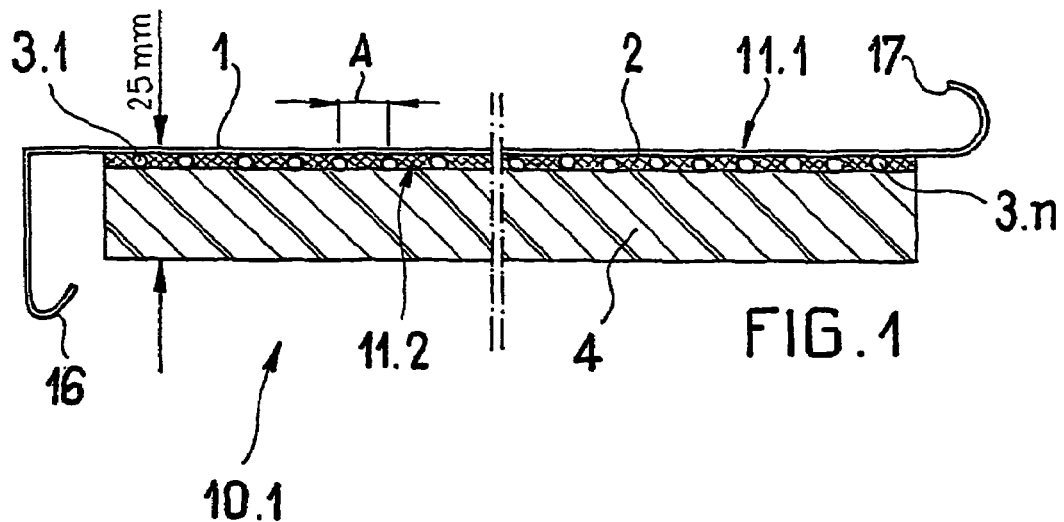
FIGS. 1 and 2 show a cross-section of a flat collector module in two embodiment examples, in schematic representation.

The preferred embodiments of the present invention will now be described with reference to FIGS. 1-7 of the drawings. Identical elements in the various figures are designated with the same reference numerals.

Figure 7:
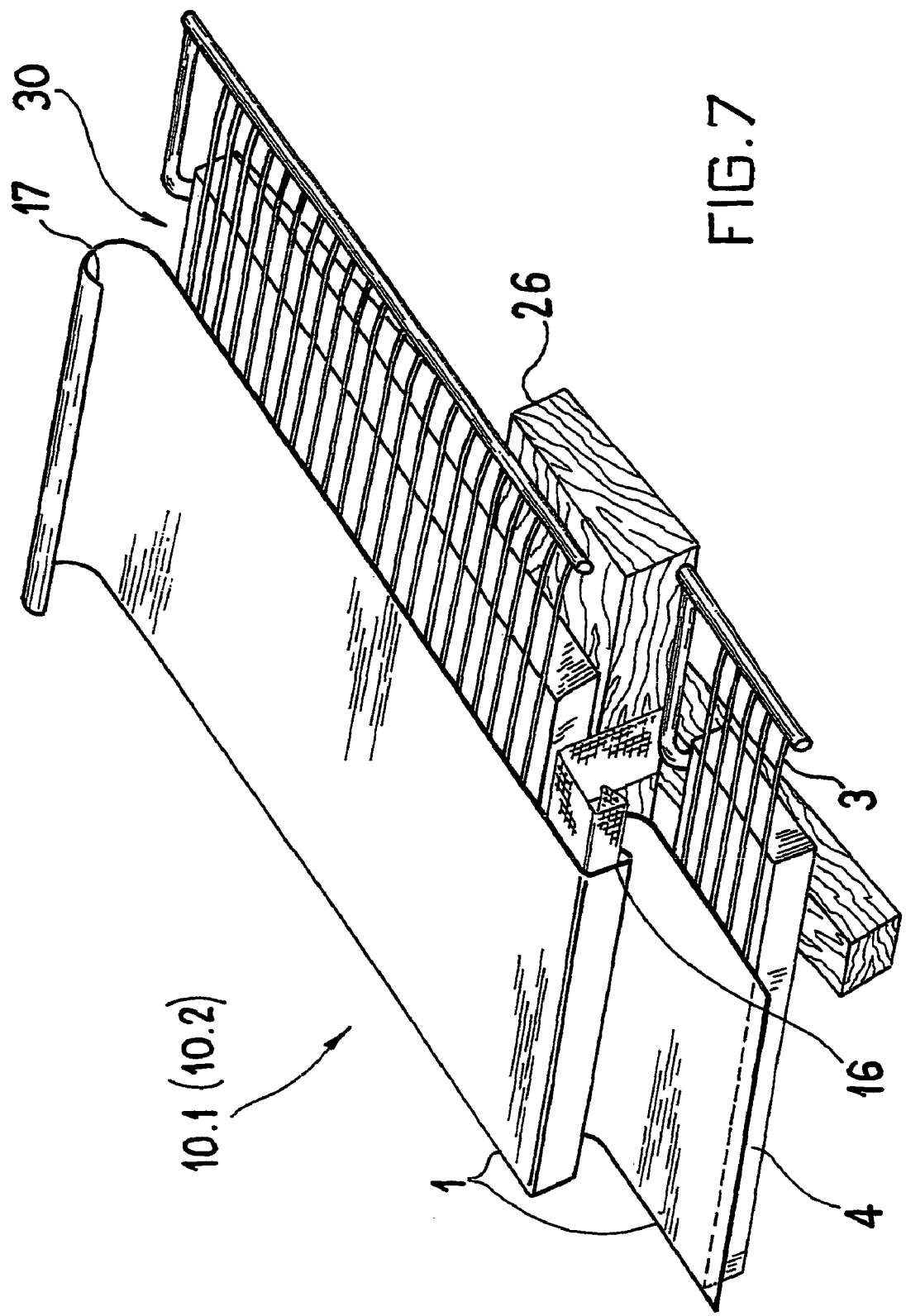
FIG. 7 shows the flat collector module per FIG. 3 in a perspective, schematic view.

FIGS. 1 and 7 show a flat collector module 10.1 that consists of a flat, rectangular sheet metal panel 1, a register-type arrangement 30 of capillary tubes 3.1, . . . , 3.n extending parallel to one another, and a thermally insulating insulation core 4 of polyurethane hard foam. The insulation core 4 possesses a thickness of 25 mm. The material of the pre-weathered and thus darker sheet metal panel 1 is an alloy of titanium and zinc, currently a product of, RHEINZINK GmbH & Co. KG in Datteln, Germany. Surface treatment allows achieval of a high degree of absorption since less reflection occurs.

The sheet metal panel 1 is of the following dimensions:
length 3,000 mm;
width 400 mm;
thickness 0.8 mm.

Figure 6:
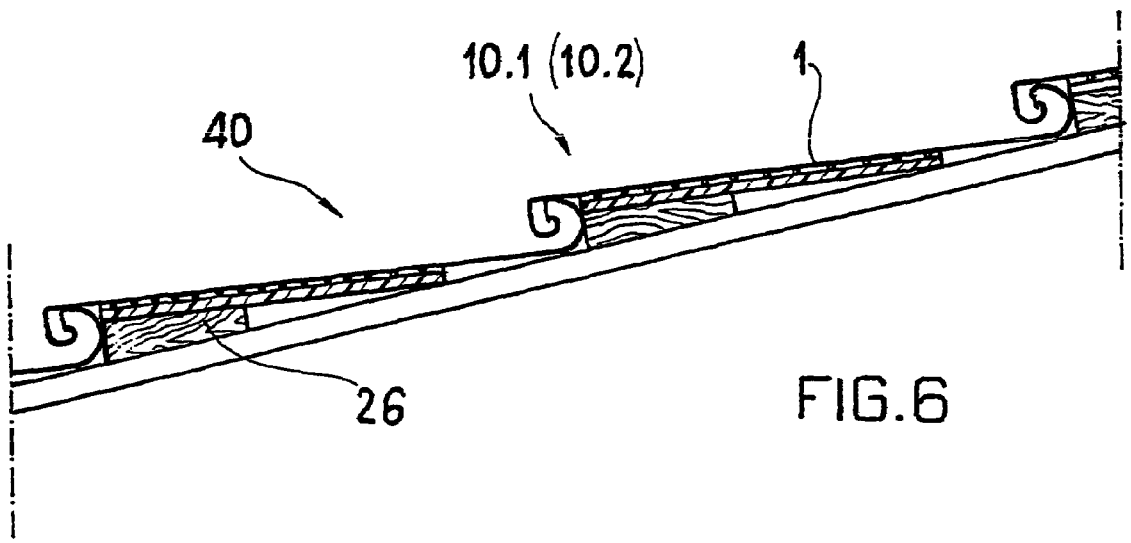
FIG. 6 shows a schematic cross-section of a stair step roof with built-in flat collector modules, in cross-section.

Further, the sheet metal panel 1 includes two angled, arc-shaped margins 16, 17 that serve for attachment to adjacent sheet metal panels in order to form a stair step roof 40 per FIG. 6.

Each of the plastic capillary tubes 3.1, . . . , 3.n possesses an outer diameter of about 2.5 to 3.5 mm. The capillary tubes 3.1, . . . , 3.n extend at a uniform separation A of about 8 to 15 mm from one another. Thus, about 30 parallel-lying capillary tube sections may be mounted in a single flat collector module 10.1 of 400 mm width.

The sheet metal panel 1 is bonded to the insulation core 4 by means of an elastic adhesive layer 2 that possesses a thickness not exceeding the outer diameter of the capillary tube. A fluid adhesive is sprayed onto a horizontal surface 5 of the insulation core, and then the entire arrangement 30 of capillary tubes 3.1, . . . , 3.n is immediately laid with the sheet metal panel 1 and pressed until the capillary tubes are embedded.

In this case, a cold-hardening single-component polyurethane-base adhesive is used, a product of Sika GmbH, Stuttgart. The adhesive layer 2 remains elastic after hardening.

Overall, a new type of flat collector module has been created that includes a form-fit but elastic bond of the insulation core 4 to the sheet metal panel 1 that is formed by the adhesive layer 2 that surrounds the capillary tubes in contact with the sheet metal panel. The capillary tubes 3.1, . . . , 3.n are also elastic, and thus may give when under tension.

The relatively thin insulation core 4 of polyurethane hard foam provides adequate strength to the bond so that it may be laid directly on the roof battens of the roof sub-structure (see FIG. 6).

Through the use of the adhesive bond with embedded capillary tubes and the selection of insulation materials and their thickness, an advantageously low thickness of the flat collector module is achieved. In this case, it is 25 mm.

Figure 2:
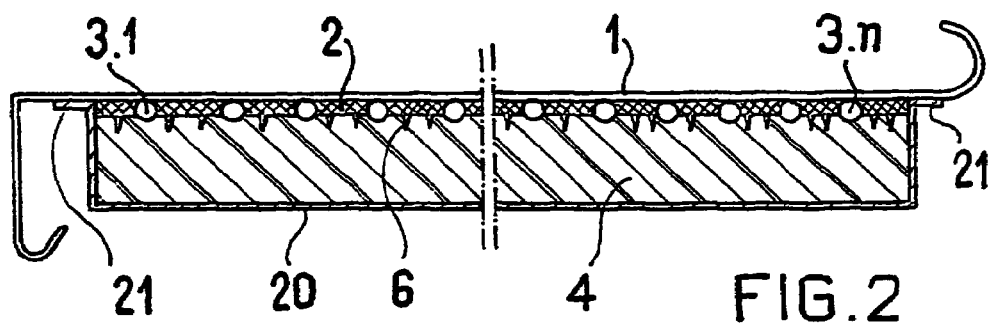
Figure 3:
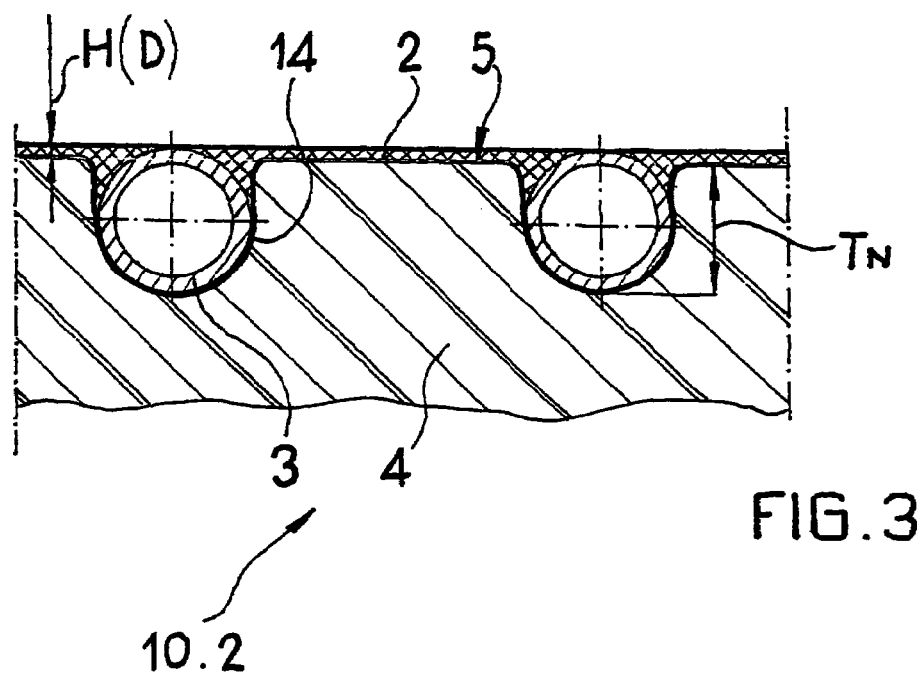
FIG. 3 shows an enlarged detailed view of the cross-section in FIG. 2.
Figure 4:
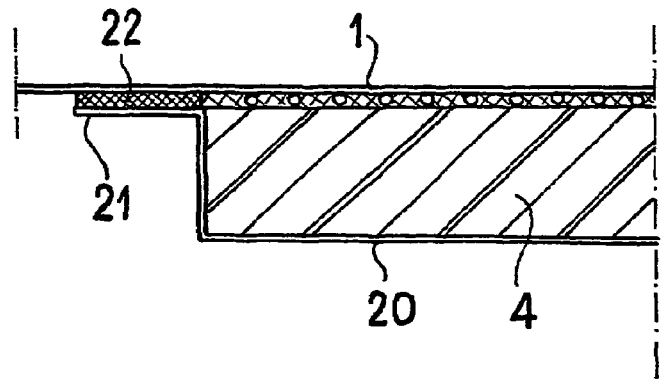
FIG. 4 illustrates the positioning of an elastic body between the sheet metal panel and a metal cassette.

In another embodiment (reference index 10.2) shown in FIGS. 2 through 4, slots 14 are worked into the surface 5 of the insulation core 4 to receive the capillary tubes 3.1, . . . , 3.n. The capillary tubes extend out over the insulation core 4 by a small amount H=1.5 mm, which thickness corresponds to a thickness dimension D of the still fluid adhesive layer 2 before hardening.

Further, FIGS. 2 and 4 show a metal cassette 20 (here, an aluminum plate) surrounding the insulation core 4 that stiffens the entire bond without suffering loss of elasticity of the adhesive bond. The metal cassette 20 includes two opposing edges 21 angled outward and mirror-symmetrical to each other that rest on the underside 11.2 of the sheet metal panel. Elastic bodies 22, each arranged in the form of a soft foam strip between the sheet metal panel 1 and the angled edges 21 of the metal cassette 20 have the task of preventing thermal transfer and enabling the relative displacements of the sheet metal panel and the metal cassette. The metal cassette 20 is bonded in points to the insulation core 4.

Further, FIG. 2 shows numerous recesses 6 that are formed into the surface 5 of the insulation core 4 by the pressure force of a bristle roller (not shown) heated to about 200° C. The fluid adhesive flows into the recesses and hardens there.

Figure 5:
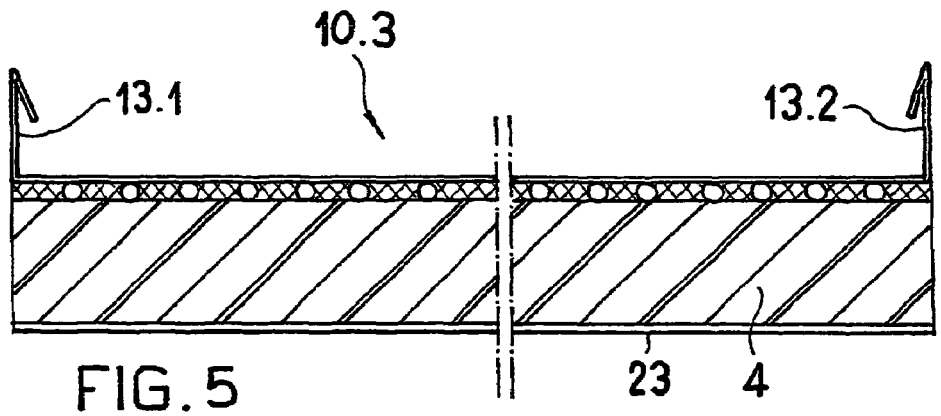
FIG. 5 shows a flat collector module suitable for connection using a folded technique, in schematic representation.

FIG. 5 shows a further flat collector module (reference index 10.3) that distinguishes itself from the flat collector module shown in FIG. 1 in that the sheet metal panel possesses two angled bent edges 13.1, 13.2 instead of the arc-shaped edges to connect the sheet metal panels to one another in a folding technique. Further, the side of the insulation core 4 facing away from the sheet metal panel 1 is supported by a plate-shaped stiffening element 23. This stiffening element is also of aluminum plate, and is bonded to the insulation core 4.

There has thus been shown and described a novel helio-thermal flat collector module with sandwich design which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

| Reference Index List | |
|---|---|
| 1. | Sheet metal panel |
| 2. | Adhesive layer |
| 3.1 ... 3.n | Capillary tubes |
| 4. | Insulation core |
| 5. | Surface |
| 6. | Recess |
| 10.1; 10.2; 10.3 | Flat collector module |
| 13.1, 13.2 | Edges |
| 14. | Slot |
| 16. | Edge |
| 17. | Edge |
| 20. | Metal cassette |
| 21. | Edge |
| 22. | Body |
| 23. | Stiffening element |
| 26. | Surface |
| 30. | Arrangment |
| 40. | Stair step roof |
| A | Separation |
| D | Thickness dimension |
| H | An amount |
| $T_N$ | Slot depth |

What is claimed is:

1. In a self-supporting, heliothermal flat collector module for use as a roof shingle, including:
   a self-supporting sheet metal panel having two sides and adapted to be irradiated by sunlight on one side, said sheet metal panel being formed with two opposing, angled edges to interlock with another sheet metal panel on a roof,
   a register-shaped arrangement of capillary tubes, separated from one another at a distance for the flow of a fluid medium, said arrangement being positioned on, and adhered to, the side opposite the side of the sheet metal panel to be irradiated, and
   a thermally-insulating, insulation core that is also positioned on the opposite side of the sheet metal panel to be irradiated,
the improvement wherein
   the surface of the insulation core is planar,
   the capillary tubes of the register-shaped arrangement are placed in contact with the planar surface of the insulation core,
   the insulation core is bonded to the sheet metal panel by means of a non-metallic, elastic adhesive layer,
   the capillary tubes are at least partially embedded into the adhesive layer between the sheet metal panel and the insulation core, and
   the sheet metal panel is made of a titanium zinc alloy and is pre-weathered on the heat-absorbing side.

2. Flat collector module as in claim 1, wherein the insulation core comprises foam.

3. Flat collector module as in claim 2, wherein the foam is selected from the group consisting of foamed polystyrene and polyurethane.

4. Flat collector module as in claim 1, wherein insulation core comprises fibrous material.

5. Flat collector module as in claim 1, wherein the material of the adhesive layer has a higher thermal-conductivity coefficient than the material of the insulation core.

6. Flat collector module as in claim 1, wherein the adhesive layer is formed of an adhesive based on meth-acrylate.

7. Flat collector module as in claim 1, wherein the capillary tubes comprise a material selected from the group consisting of metal, peripherally metal-coated plastic, and of non-coated plastic.

8. Flat collector module as in claim 1, wherein the planar surface of the insulation core includes numerous recesses to receive the adhesive.

9. Flat collector module as in claim 8, wherein the recesses are formed by the pressure of a bristle roller or similar device.

10. Flat collector module as in claim 1, wherein the sheet metal panel is formed of one piece with two angled and arc-shaped profiles at opposite edges.

11. Flat collector module as in claim 1, wherein the side of the insulation core facing away from the sheet metal panel is supported by a plate-shaped stiffening element.

12. Flat collector module as in claim 1, wherein the insulation core is partially surrounded by a plastic or metal cassette.

13. Flat collector module as in claim 12, wherein the cassette includes two opposing margins angled outwards so that an elastic body is positioned between the angled margin of the metal cassette.

14. Flat collector module as in claim 13, wherein the elastic body is selected from the group consisting of a foam strip and adhesive band.

15. Flat collector module as in claim 1, wherein the module possesses an overall thickness, including insulation core, in the range of 10 mm to 50 mm.

16. Flat collector module as in claim 1, which is installed in a stair step roof, whose surface consists of sheet metal panels connected to one another.

17. Flat collector module as in claim 1, wherein the module possesses an overall thickness, including insulation core, in the range of 25 mm to 35 mm.

18. Flat collector module as in claim 1, wherein the adhesive layer is made of a reaction adhesive.

* * * * *